(12) United States Patent
Ayel et al.

(10) Patent No.: US 12,546,895 B2
(45) Date of Patent: Feb. 10, 2026

(54) DEVICE OF ACQUISITION OF A 2D IMAGE AND OF A DEPTH IMAGE OF A SCENE

(71) Applicant: Commissariat à l'Énergie Atomique et aux Énergies Alternatives, Paris (FR)

(72) Inventors: François Ayel, Grenoble (FR); Yvon Cazaux, Grenoble (FR); Gaelle Palmigiani, Grenoble (FR); Alexis Rochas, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 1095 days.

(21) Appl. No.: 17/499,760

(22) Filed: Oct. 12, 2021

(65) Prior Publication Data

US 2022/0113425 A1    Apr. 14, 2022

(30) Foreign Application Priority Data

Oct. 14, 2020  (FR) ..................................... 2010487

(51) Int. Cl.
| | | |
|---|---|---|
| G01S 17/00 | (2020.01) | |
| G01S 7/4863 | (2020.01) | |
| G01S 7/4865 | (2020.01) | |
| G01S 17/894 | (2020.01) | |

(52) U.S. Cl.
CPC .......... *G01S 17/894* (2020.01); *G01S 7/4863* (2013.01); *G01S 7/4865* (2013.01)

(58) Field of Classification Search
USPC ............................................. 356/4.01, 5.01
See application file for complete search history.

(56) References Cited

U.S. PATENT DOCUMENTS

| | | | | |
|---|---|---|---|---|
| 9,081,095 | B2 * | 7/2015 | Suzuki ................. | G01S 7/4863 |
| 10,309,610 | B2 * | 6/2019 | Glickman .............. | F21S 43/26 |
| 10,613,202 | B2 * | 4/2020 | Roy .................... | H10F 39/8033 |
| 10,859,680 | B2 * | 12/2020 | Seliuchenko ......... | G01S 7/4914 |

(Continued)

FOREIGN PATENT DOCUMENTS

WO    WO 2010/144616 A1    12/2010

OTHER PUBLICATIONS

Written Opinion and Search Report for FR 3115145 (Year: 2021).*
Preliminary Search Report for French Application No. 2010487, dated Jun. 10, 2021.

*Primary Examiner* — James R Hulka
(74) *Attorney, Agent, or Firm* — Wolf, Greenfield & Sacks, P.C.

(57) ABSTRACT

A device of acquisition of a depth image and of a 2D image of a scene, including depth photosites and capacitors, each depth photosite including a photodiode capable of detecting a reflected light signal, and at least one sense node coupled to the photodiode by a single transistor. Each capacitor is connected between the sense nodes of two photosites or between two sense nodes of a same photosite. Depth photosites supply the first plate of each capacitor with at least one first sample of charges photogenerated during first time periods, and supplying the second plate of each capacitor with a second sample of charges photogenerated during second time periods. Depth photosites supply the first plate of each capacitor with at least one third sample of charges photogenerated during third time periods.

13 Claims, 6 Drawing Sheets

(56) References Cited

U.S. PATENT DOCUMENTS

| | | | |
|---|---|---|---|
| 12,055,638 B2 * | 8/2024 | Rochas | ............... H10F 39/809 |
| 2012/0312966 A1 | 12/2012 | Suzuki et al. | |
| 2018/0306909 A1 | 10/2018 | Seliuchekno | |
| 2019/0086519 A1 | 3/2019 | Roy et al. | |
| 2019/0137609 A1 | 5/2019 | Roy | |
| 2022/0113424 A1 * | 4/2022 | Rochas | ............... H04N 23/56 |

* cited by examiner

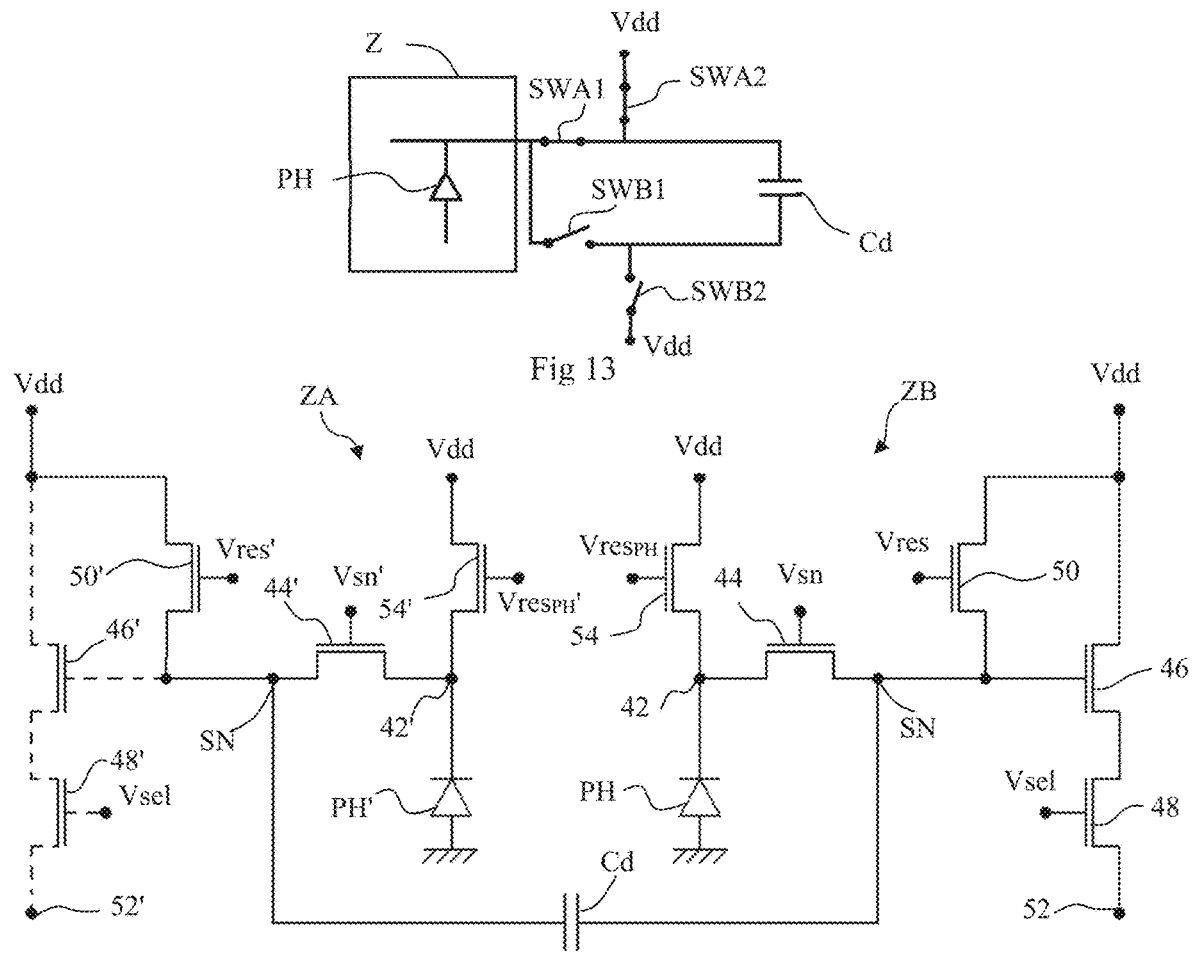

DEVICE OF ACQUISITION OF A 2D IMAGE AND OF A DEPTH IMAGE OF A SCENE

CROSS REFERENCE TO RELATED APPLICATIONS

This application claims priority to French patent application FR20/10487, filed on Oct. 14, 2020. The contents of which is incorporated herein by reference in its entirety.

TECHNICAL BACKGROUND

The present application concerns image acquisition devices and, more particularly, image acquisition devices capable of acquiring a 2D image and a depth image of a scene.

PRIOR ART

Image acquisition devices capable of acquiring depth information have been provided. For example, indirect time-of-flight (iToF) detectors act to emit a light signal towards a scene, and then to detect the return light signal reflected by objects of the scene. By the estimation of the phase shift between the emitted light signal and the reflected signal, the distance to the device of acquisition of images of the scene can be estimated.

In certain applications, it would be desirable to be able to capture both a 2D image of a scene and a corresponding depth image of the scene.

While a solution to achieve this object would be to use separate image sensors to capture the 2D image and the depth image, such a solution is not optimal due to the fact that the sensors will have different viewpoints on the scene, which results in a misalignment between the pixels of the corresponding images. Further, the use of two sensors would increase the bulk and the cost of the device.

Another solution is to integrate the pixels of the 2D image and the depth pixels in a same array of detectors. It is however then desirable for the dimensions of the depth pixels to be decreased to a maximum to minimize the loss of information on the 2D image.

It would be desirable to have a device of acquisition of a 2D image and of a depth image of a scene, such a device at least partially overcoming one or a plurality of the disadvantages of known devices.

SUMMARY

An embodiment provides a device of acquisition of a depth image and of a 2D image of a scene, comprising 2D image pixels, depth photosites, and capacitors, each comprising first and second plates, each depth photosite comprising a photodiode, capable of detecting a reflected light signal corresponding to the reflection on the scene of an incident amplitude-modulated light signal in near infrared, and at least one sense node coupled to the photodiode by a single transistor, each capacitor being connected between the sense nodes of two photosites or between two sense nodes of a same photosite. At least a portion of the depth photosites is configured to supply the first plate of each capacitor of at least a portion of the capacitors with at least one first sample of charges photogenerated by detection of the reflected light signal during first time periods, and to supply the second plate of each capacitor of said portion of the capacitors with a second sample of charges photogenerated by detection of the reflected light signal during second time periods offset with respect to the first times periods by a first constant phase shift. At least a portion of the depth photosites is configured to supply the first plate of each capacitor of at least a portion of the capacitors with at least a third sample of charges photogenerated by detection of the reflected light signal during third time periods offset with respect to the first times periods by a second constant phase shift different from the first phase shift.

According to an embodiment, the first and second samples are supplied by the same depth photosite.

According to an embodiment, the first and second samples are supplied by different depth photosites.

According to an embodiment, the depth photosites of said portion of the depth photosites are configured to supply the second plate of each capacitor of said portion of the capacitors with a fourth sample of charges photogenerated by detection of the reflected light signal during fourth time periods offset with respect to the first times periods by a third constant phase shift different from the first and second phase shifts.

According to an embodiment, the third and fourth samples are supplied by the same depth photosite.

According to an embodiment, the first and second samples are supplied by a same depth photosite and the third and fourth samples are supplied by a depth photosite different from the depth photosite having supplied the third and fourth samples.

According to an embodiment, the first and second samples are supplied by a same photosite during the acquisition of a first depth image and the third and fourth samples are supplied, during the acquisition of a second depth image, by the same depth photosite having supplied the first and second samples.

According to an embodiment, the third and fourth samples are supplied by different depth photosites.

According to an embodiment, the first and second samples are supplied by different depth photosites and the third and fourth samples are supplied by depth photosites different from the depth photosites having supplied the third and fourth samples.

According to an embodiment, the first and second samples are supplied by different depth photosites during the acquisition of a first depth image and the third and fourth samples are supplied, during the acquisition of a second depth image, by the depth photosites having supplied the first and second samples.

An embodiment also provides a system of acquisition of a depth image comprising the acquisition device such as previously defined, a light source configured to emit the periodically amplitude-modulated incident light signal in near infrared, and a processor configured to determine, from the first, second, and third samples, a phase shift between the incident light signal and the reflected light signal.

According to an embodiment, the processor is configured to determine the phase shift between the incident light signal and the reflected light signal from the first, second, third, and fourth samples.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 13 illustrates a step of another embodiment of a differential readout method;

FIG. 14 schematically shows an embodiment of a circuit of a photosite capable of detecting depth information; and FIG. 15 schematically shows another embodiment of a circuit of a photosite capable of detecting depth information.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the forming of the photodiodes of the 2D image pixels and of the depth pixels has not been detailed, the forming of such pixels being within the abilities of those skilled in the art based on the indications of the present description. Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a depth image acquisition device in a normal position of use. Unless specified otherwise, the expressions "around", "approximately", "substantially" and "in the order of" signify within 10%, and preferably within 5%.

Figure 1:
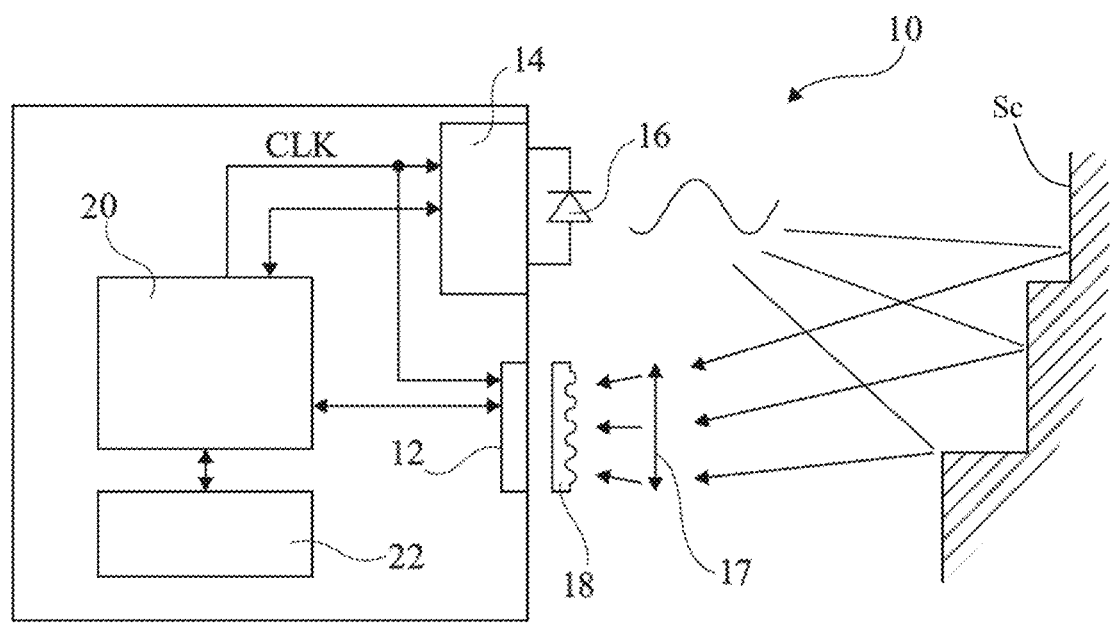
FIG. 1 schematically shows an embodiment of a 2D image and depth image forming system.

FIG. 1 schematically shows an embodiment of a depth image forming system 10 comprising a device 12 of combined acquisition of a 2D image and of a depth image. System 10 for example comprises a light signal emission circuit 14 which drives a light source 16, for example, a light-emitting diode (LED). Light-emitting diode 16 for example emits a light signal at a wavelength in the near infrared spectrum, for example, in the range from 700 nm to 1,100 nm. The light signal generated by light-emitting diode 16 is for example emitted towards image scene Sc via one or a plurality of lenses (not shown in FIG. 1). The light of the light signal reflected from image scene Sc is captured by image acquisition device 12, for example, via an image-forming lens 17 and an array of microlenses 18 which focus the light on the individual pixels of image acquisition device 12.

Image acquisition device 12 for example comprises a plurality of pixels capable of receiving the light signal reflected by the image scene and of detecting the phase of the received signal to form a depth image. These pixels are called depth pixels hereafter. Image acquisition device 12 further comprises a plurality of pixels capable of capturing visible light from the image scene to form a 2D image, these pixels being called 2D image pixels hereafter.

A processor 20 of image-forming system 10 is for example coupled to image acquisition device 12 and to light signal emission circuit 14 and determines, based on the signals captured by the depth pixels of image acquisition device 12, the corresponding distances of the objects in image scene Sc. The 2D image captured by image acquisition device 12 and the depth image generated by processor 20 are for example stored in a memory 22 of image-forming system 10.

Figure 2:
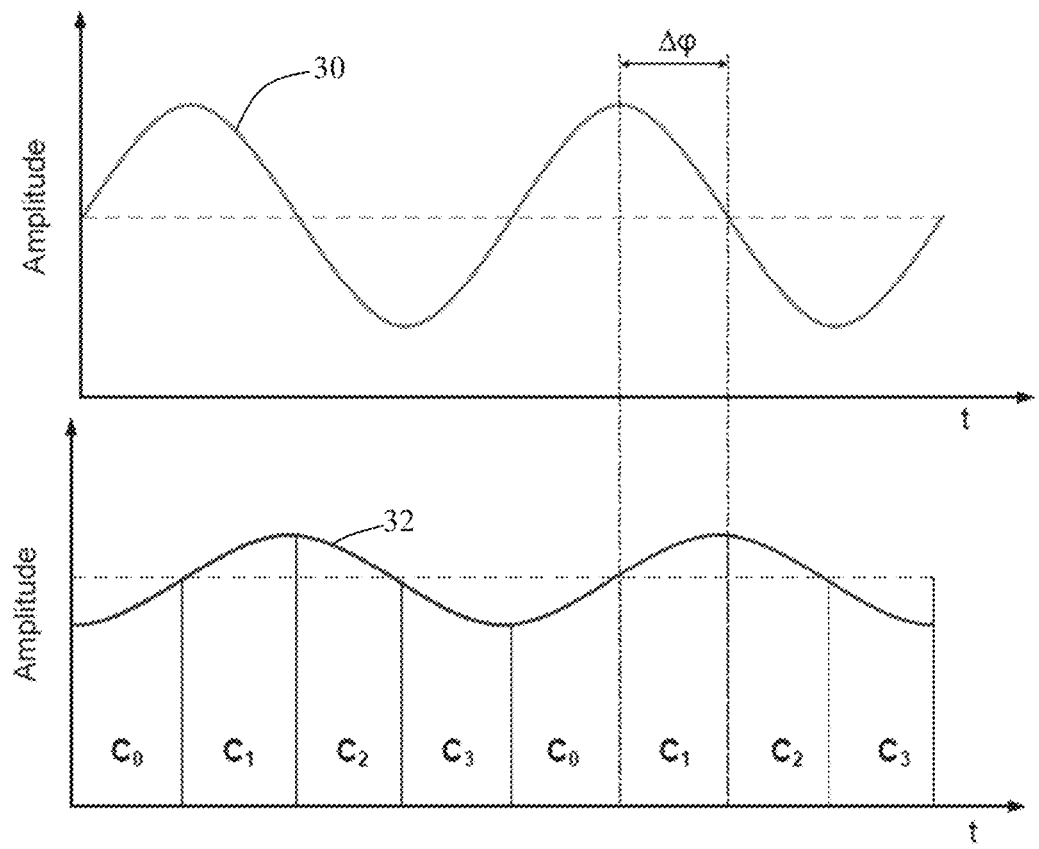
FIG. 2 is a graph illustrating an example of light intensity of a light signal emitted and reflected according to an embodiment.

FIG. 2 is a graph showing, by a curve 30, an example of time variation of the light intensity of the light signal emitted by light-emitting diode 16 towards image scene Sc and, by a curve 32, an example of time variation of the light intensity of the light signal received by one of the depth pixels of image acquisition device 12. Although, to simplify the comparison, these signals are shown in FIG. 2 as having the same intensity, in practice the light signal received by each depth pixel is likely to be notably less intense than the emitted signal. In the example of FIG. 2, the light signal has the shape of a sine wave. However, in alternative embodiments, it may have a different periodic shape, for example formed of a sum of sine waves, of triangular shape, or square-shaped.

The depth pixels of the present description are based on photodetectors used to detect the phase of the received light signal. There is a phase shift $\Delta\varphi$ between the emitted light signal and the received light signal, which represents the time of flight (ToF) of the light signal originating from light-emitting diode 16 to image acquisition device 12 via an object of image scene Sc which reflects the light signal. An estimate of the distance d to the object in image scene Sc can thus be calculated by using the following equation Math_1:

$$d = \frac{c}{4\pi f}\Delta\varphi \qquad \text{[Math 1]}$$

where c designates the speed of light, and f the frequency of the light signal.

Phase shift $\Delta\varphi$ is for example estimated based on a sampling of the signal captured by a depth pixel during at least three distinct sampling windows, preferably during four distinct sampling windows, during each period of the light signal. A technique based on the detection of four samples per period is described in further detail in R. Lange and P. Seitz's publication entitled "Solid-state TOF range camera", IEEE J. on Quantum Electronics, vol. 37, No. 3, March 2001, which is incorporated herein by reference as authorized by law. As an example, in FIG. 2, the acquisition of four samples per period has been illustrated.

The samples of each sampling window are for example integrated over a large number of periods, for example over approximately 100,000 periods, or more generally between 10,000 and 10 millions of periods. Each sampling window for example has a duration ranging up to one quarter of the period of the light signal. These sampling windows are called $C_0$, $C_1$, $C_2$, and $C_3$ in FIG. 2 and, in the example of FIG. 2, each sampling window is of a same duration and the four sampling windows have a total cycle time equal to the period of the light signal. More generally, there may or not be a time interval separating a sampling window from the next one and, in certain cases, there may be an overlapping between sampling windows. Each sampling window for example has a duration in the range from 15% to 35% of the period of the light signal in the case of a depth pixel capturing four samples per period. Each sampling window for example has a duration in the range from 25% to 40% of the period of the light signal in the case of a depth pixel capturing three samples per period.

The timing of sampling windows $C_0$ to $C_3$ is controlled to be synchronized with the timing of the emitted light signal. For example, light signal emission circuit 14 generates a light signal based on a clock signal CLK (FIG. 1), and image acquisition device 12 receives the same clock signal CLK to control the time of end of each sampling window by for example using delay elements to introduce the appropriate phase shifts.

Based on the integrated samples of the light signal, and for a purely sine light wave, the phase shift $\Delta\varphi$ of the light signal may be determined by using the following equation Math_2, in the case where four samples $C_0$, $C_1$, $C_2$, and $C_3$ are acquired per period:

$$\Delta\varphi = \arctan\left(\frac{C_3 - C_1}{C_0 - C_2}\right) \quad \text{[Math 2]}$$

In the case where three samples $C_0$, $C_1$, and $C_2$ are acquired per period, the phase shift $\Delta\varphi$ of the light signal may be determined by using the following equation Math_3:

$$\Delta\varphi = \arctan\left(\frac{\sqrt{3}(C_2 - C_1)}{(C_0 - C_1) + (C_0 - C_2)}\right) \quad \text{[Math 3]}$$

In certain embodiments, the frequency f of the light signal is 25 MHz, or more generally in the range from 20 MHz to 200 MHz.

In the following description call "photosite" a photodetector and all the electronic components enabling to acquire at least one sample of generated charges by absorption by this photodetector of the light signal reflected by the scene, a depth image of which is desired, and call "pixel" all the electronic components necessary to allow the determination of a depth value. In particular, a pixel may comprise a plurality of photosites.

To determine the phase shift $\Delta\varphi$ between the emitted light signal and the light signal received by the depth pixel, the received light signal is sampled by successively transferring, at regular intervals, charges photogenerated in the photosensitive element of a photosite during the first sampling window $C_0$, charges photogenerated in the photosensitive element of the same photosite or of another photosite during the second sampling window $C_1$, charges photogenerated in the photosensitive element of the same photosite or of another photosite during the third sampling window $C_2$, in the case where a depth value is determined from three samples, and charges photogenerated in the photosensitive element of the same photosite or of another photosite during the fourth sampling window $C_3$, in the case where a depth value is determined from four samples. These three or four transfers are repeated a large number of times, for example, 100,000 times before the obtained signals are read by the output circuit.

Figure 3:
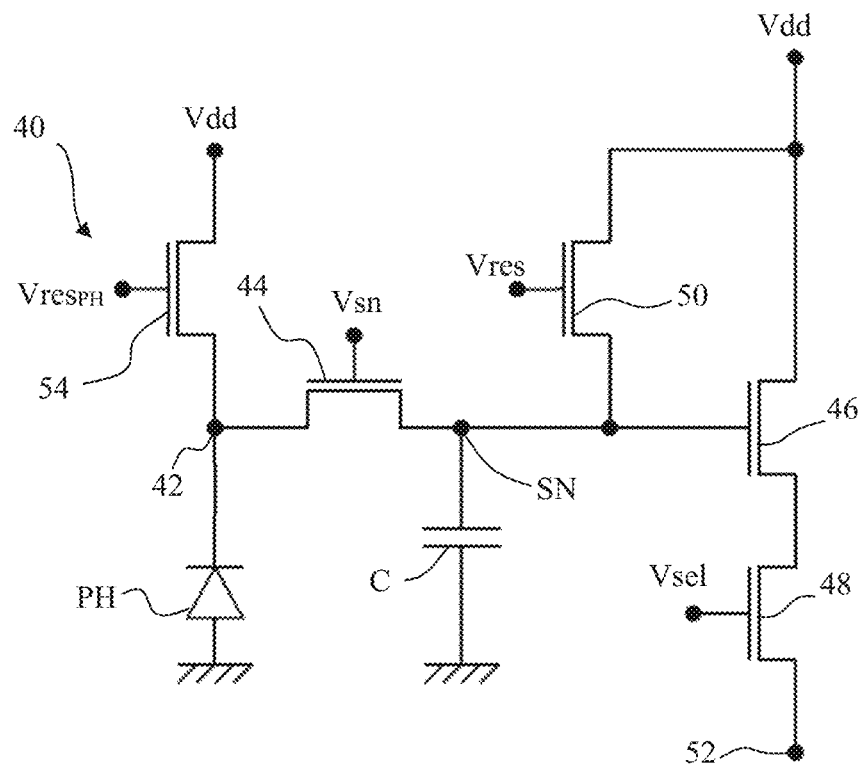
FIG. 3 schematically shows an example of a circuit of a photosite capable of detecting depth information.

FIG. 3 is a circuit diagram illustrating an example of a circuit 40 of a depth photosite. Circuit 40 is capable of performing a voltage storage. Circuit 40 comprises a photosensitive element PH, for example, a fast photodiode, coupled between a node 42 and a source of a low reference potential, for example, the ground. Node 42 is coupled to a sense node SN via a transfer gate 44, which is for example an n-channel MOS transistor. Transfer gate 44 is controlled by a signal Vsn applied to its control node. As shown in FIG. 3, a capacitor C may be added on sense node SN, to increase the storage capacitance and decrease the thermal noise present in the photosite. As a variant, the capacitance at sense node SN may also be only formed by the interconnects of the photosite.

Circuit 40 further comprises an output circuit formed of a follower-source transistor 46, of a selection transistor 48, and of a reset transistor 50, these transistors for example being n-channel MOS transistors. Sense node SN is coupled to the control node of transistor 46, which for example has its drain coupled to a source of a high reference potential Vdd, and its source coupled to an output line 52 of circuit 40 by transistor 48 which is controlled by a signal Vsel applied to its gate. Sense node SN' is also coupled to the source of reference potential Vdd, or to a source of another reference potential, through transistor 50, which is controlled by a signal Vres applied to its gate. In alternative embodiments, the output circuit may be shared by a plurality of photosites, sense node SN being for example coupled to the sampling circuit of one or a plurality of adjacent photosites.

The reading of a sample is performed by the transfer of the charges collected in photodiode PH to sense node SN. There is no storage in an intermediate memory that would be interposed between photodiode PH and transfer gate 44, and that would be coupled to photodiode PH by an additional transfer gate.

Circuit 40 further comprises a transistor 54, for example, a n-channel MOS transistor, coupling node 42 to the source of reference potential Vdd and enabling photodiode PH to be reset. Transistor 54 is for example controlled by a signal $Vres_{PH}$. It thus enables to control the exposure time of photodiode PH by ensuring an emptying of photodiode PD before a synchronous integration starting for all the sensor photodiodes PH and it enables to ensure an anti-blooming function to avoid an overflow of photodiode PH into sense node SN during the general reading of the array.

The reading from the depth pixels is performed row by row, by reading the values stored on the sense nodes SN of the row pixels during the sampling. The values must remain stable on sense nodes SN for the entire reading, however, the pixels always receive parasitic light. This might cause the saturation of sense nodes SN waiting to be read from, by overflow of photodiode PH.

Figure 4:
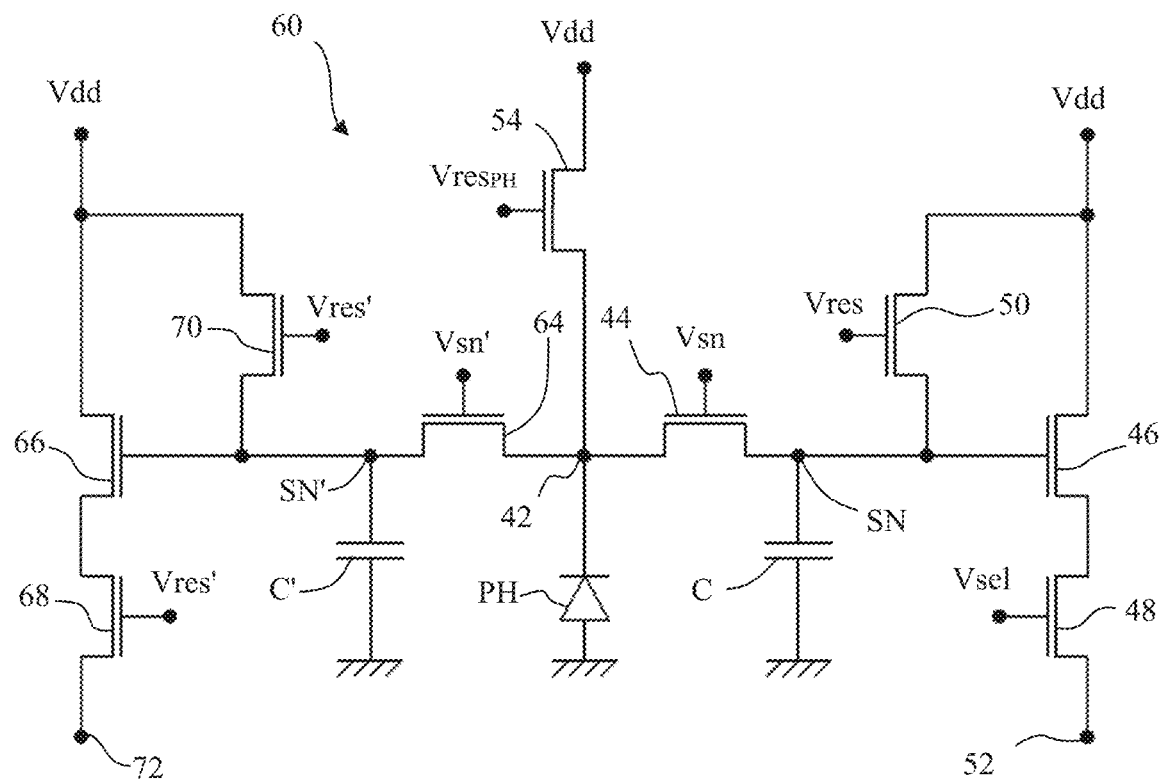
FIG. 4 schematically shows another example of a circuit of a photosite capable of detecting depth information.

FIG. 4 is a circuit diagram illustrating another example of a depth photosite circuit 60. Circuit 60 comprises all the elements of circuit 40 and comprises a second sense node SN' coupled to node 42 via a transfer gate 64, which is for example an n-channel MOS transistor. Transfer gate 64 is controlled by a signal Vsn' applied to its control node. Circuit 60 further comprises a second output circuit formed of a follower-source transistor 66, of a selection transistor 68, and of a reset transistor 70, these transistors for example being n-channel MOS transistors. Sense node SN' is coupled to the control node of transistor 66, which for example has its drain coupled to the source of reference potential Vdd, and its source coupled to an output line 72 of circuit 60 by transistor 68, which is controlled by a signal Vsel' applied to its gate. Sense node SN' is also coupled to the source of power supply voltage Vdd through transistor 70, which is controlled by a signal Vres' applied to its gate.

Figure 5:
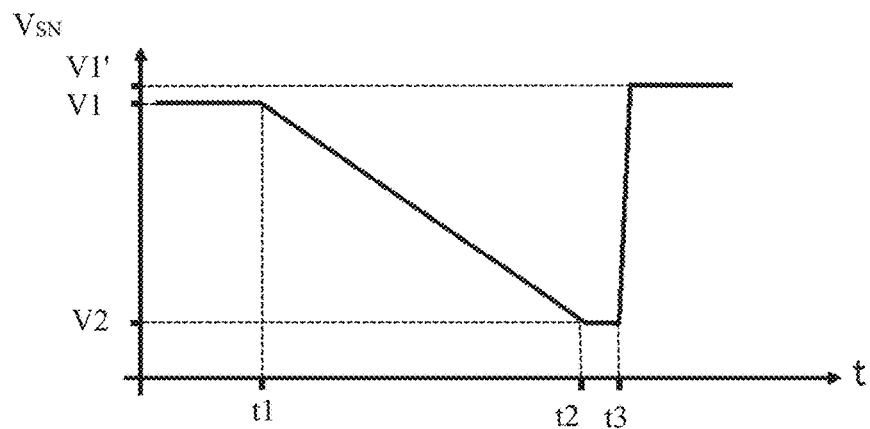
FIG. 5 is a timing diagram of the voltage at the sense node of a photosite during a readout operation.

FIG. 5 is a timing diagram of voltage $V_{SN}$, referenced to ground, at the sense node SN of circuit 40 shown in FIG. 3 during a readout operation. Times t1, t2, and t3 are successive. Before time t1, a reset step is carried out by turning on reset transistor 50 to take the voltage at node SN to a reference value V1. Between times t1 and t2, transistor 44 is successively turned on and off several times, causing the transfer of the charges collected at each sampling in photodiode PH to sense node SN, having its voltage $V_{SN}$ varying from reference value V1 to a level V2. Between times t2 and t3, the level of the voltage at sense node SN is read by the turning on of transistor 48. At time t3, a reset step is carried out by turning on reset transistor 50, to take the voltage at node SN to a reference value V1', corresponding to the beginning of a new read cycle, where reference value V1' may be different from reference value V1 due to the thermal noise. It would be desirable to use the difference between voltage levels V1 and V2 to do away with reference value V1. In practice, difference V1'–V2 is used, the reading of level V1' being performed little after that of level V2. The noise level is set during the reset step so that the noise level noise on reference value V1' is different from the noise level on value V2. With a capacitance in the order of 5 fF, the thermal noise is in the order of 1 mV.

This noise may be disturbing in the case of 2D image pixels. This is why the use of pixel structures such as described in relation with FIGS. 3 and 4 may not be desirable. The inventors have shown that for a depth pixel capturing a radiation corresponding to the reflection of an amplitude-modulated signal in near infrared, this thermal noise is not disturbing, since there exists in any case an infrared background light which adds noise to the measurements of the reflected light signal.

According to an embodiment, rather than reading the integrated values of samples $C_0$, $C_1$, $C_2$, and $C_3$, device 12 is configured to directly read the difference between two integrated samples. Indeed, as appears from equations Math_2 and Math_3, the depth estimate only uses differences between samples.

Figure 6:
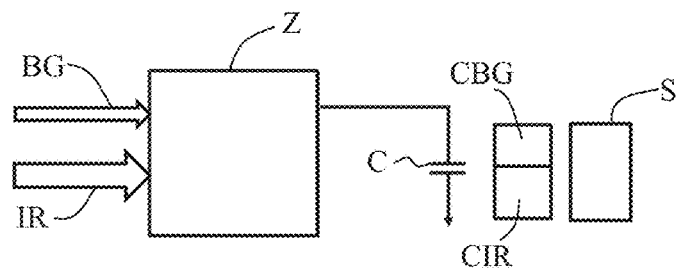
FIG. 6 illustrates the principle of a known depth pixel readout method.
Figure 7:
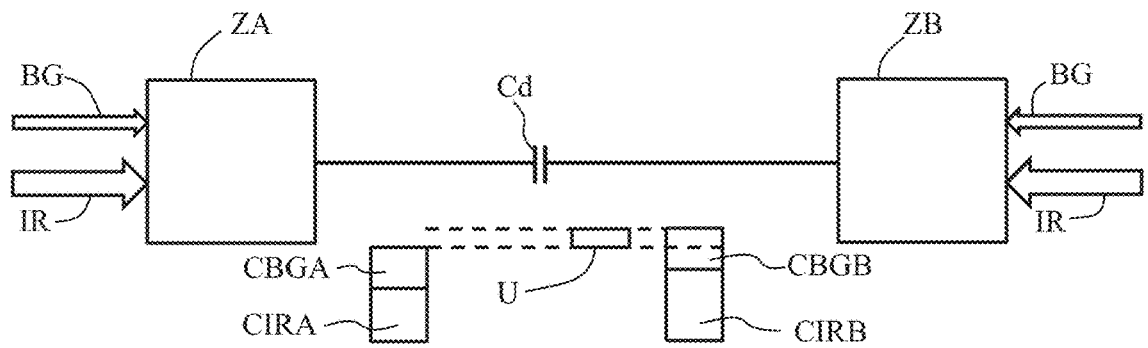
FIG. 7 illustrates the principle of an embodiment of a differential depth pixel readout method.

FIGS. 6 and 7 respectively illustrate, very schematically, the principle of a conventional sample reading and the principle of a differential reading.

FIG. 6 shows a depth pixel Z receiving a useful light signal IR in near infrared, which corresponds to the reflection of the modulated signal supplied by illumination source 16 and a parasitic light signal BG, for example corresponding to the infrared background light of the scene. Capacitor C illustrates the capacitance at the sense node SN of the pixel having, at the end of the sample collection phase, the charges collected by photodiode PH, a portion CIR of which corresponds to charges due to useful light signal IR and another portion CBG of which corresponds to charges due to parasitic light signal BG, stored therein. The conventional readout operation then comprises reading a signal S representative of all the charges stored in capacitor C.

FIG. 7 shows two depth pixels ZA and ZB, each receiving the useful light signal IR and the parasitic light signal BG. At the end of the phase of collection of a first sample by pixel ZA, the charges present at the sense node of pixel ZA comprise a portion CIRA which corresponds to charges due to the useful light signal IR and another portion CBGA which corresponds to charges due to parasitic light signal BG. At the end of the phase of collection of a second sample by pixel ZB, the charges present at the sense node of pixel ZB comprise a portion CIRB which corresponds to charges due to the useful light signal IR and another portion CBGB which corresponds to charges due to parasitic light signal BG. Since the parasitic signal is substantially constant and uniform, contributions CBGA and CBGB are close. According to an embodiment, a capacitor Cd coupled to the two sense nodes is provided. The readout operation then comprises reading voltage U across capacitor Cd, which is representative of the difference between the quantities of charges present at the two sense nodes and thus of the difference between contributions CIRA and CIRB, contributions CBGA and CBGB canceling each other. The disturbance due to the parasitic signal is thus suppressed. Further, advantageously, value U may have a larger dynamic range than that of signal S since the non-useful portion of the signal has been suppressed. According to an embodiment, the capacitance of capacitor Cd is in the range from 3 fF to 10 fF.

FIGS. 8 to 11 partially and schematically illustrate embodiments of arrangements of the pixel array of acquisition device 12. The depth photosites Z are distributed among the 2D image pixels. As an example, in the case of a color image, the 2D image pixels may comprises pixels R adapted to capturing red light, pixels B adapted to capturing blue light, and pixels G adapted to capturing green light. As an example, the 2D image pixels R, G, and B are distributed in a Bayer array, with the difference that one of the pixels G of the Bayer array is replaced with a depth photosite Z.

Figure 8:
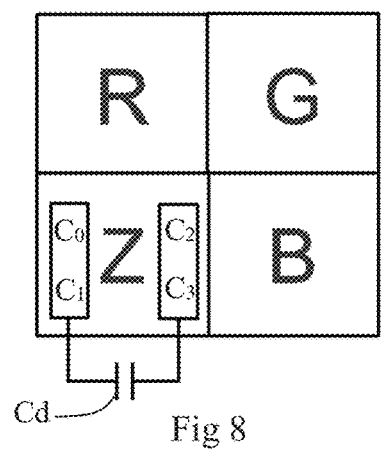
FIG. 8 schematically shows an embodiment of an arrangement of photosites of a depth image acquisition device.
Figure 9:
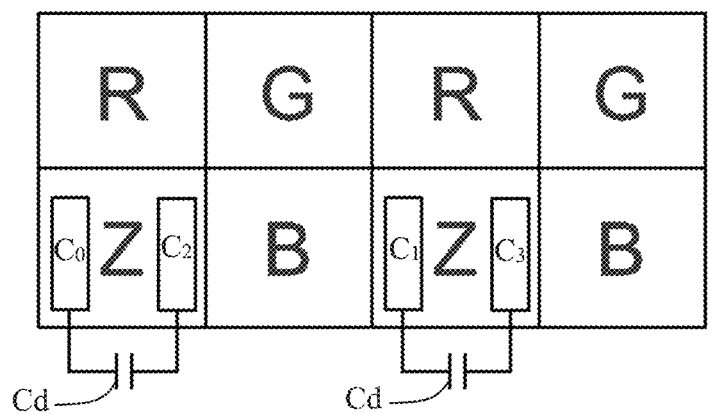
FIG. 9 schematically shows another embodiment of an arrangement of photosites of a depth image acquisition device.

In the embodiment illustrated in FIGS. 8 and 9, the acquisition of two samples for each image is performed by the same depth photosite Z, where the photosite may have a structure similar to that shown in FIG. 4. Capacitor Cd is then connected between the two sense nodes SN and SN' coupled to the photodiode PH of photosite Z.

According to the embodiment illustrated in FIG. 8, the four samples $C_0$, $C_1$, $C_2$, and $C_3$ are acquired by the same depth photosite Z, samples $C_0$ and $C_2$ being obtained during the acquisition of a first depth image, which enables to obtain the difference between samples $C_0$ and $C_2$, and samples $C_1$ and $C_3$ being obtained during the acquisition of a second depth image, which enables to obtain the difference between samples $C_1$ and $C_3$. Each depth pixel then comprises a single depth photosite.

According to the embodiment illustrated in FIG. 9, the photosites Z are distributed into photosites acquiring samples $C_0$ and $C_2$ and photosites acquiring samples $C_1$ and $C_3$. This enables to obtain the difference between samples $C_0$ and $C_2$ and the difference between samples $C_1$ and $C_3$ by the acquisition of a single depth image. Each depth pixel then comprises two depth photosites Z.

Figure 10:
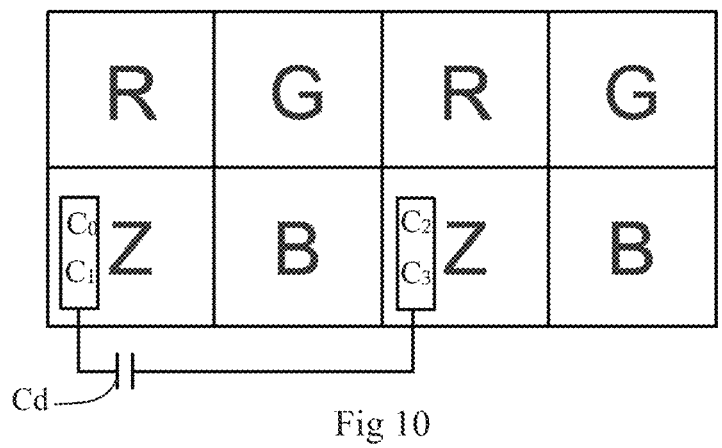
FIG. 10 schematically shows another embodiment of an arrangement of photosites of a depth image acquisition device.
Figure 11:
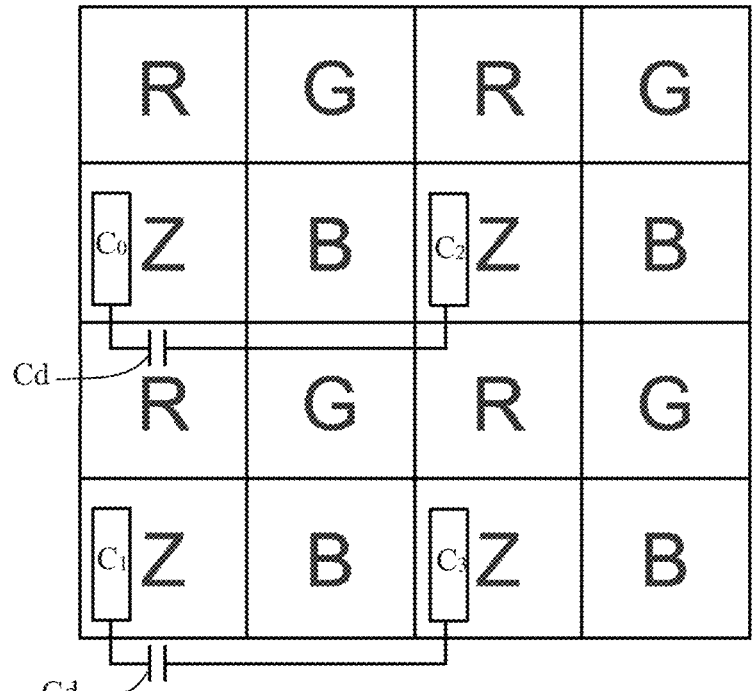
FIG. 11 schematically shows another embodiment of an arrangement of photosites of a depth image acquisition device.

In the embodiments illustrated in FIGS. 10 and 11, the acquisition to two samples to perform a differential reading is carried out by two different depth photosites Z, each depth photosite Z capable of having a structure similar to the structure shown in FIG. 3. Capacitor Cd is then connected between the sense nodes of the two depth pixels Z.

According to the embodiment illustrated in FIG. 10, the four samples $C_0$, $C_1$, $C_2$, and $C_3$ are acquired by the two depth photosites Z, samples $C_0$ and $C_2$ being obtained during the acquisition of a first depth image, which enables to obtain the difference between samples $C_0$ and $C_2$, and samples $C_1$ and $C_3$ being obtained during the acquisition of a second depth image, which enables to obtain the difference between samples $C_1$ and $C_3$. Each depth pixel then comprises two depth photosites.

According to the embodiment illustrated in FIG. 11, the photosites Z are distributed into photosites acquiring samples $C_0$ and $C_2$ and photosites acquiring samples $C_1$ and $C_3$. This enables to obtain the difference between samples $C_0$ and $C_2$ and the difference between samples $C_1$ and $C_3$ by the acquisition of a single depth image. Each depth pixel then comprises four depth photosites Z.

An advantage of the embodiments illustrated in FIGS. 10 and 11 over the embodiments implemented in FIGS. 8 and 9 is that the embodiments illustrated in FIGS. 10 and 11 have less constraints for the forming of the electronic components of the depth pixel and of capacitor Cd since the electronic components of the depth pixel are distributed over two depth photosites and capacitor Cd may be formed on the depth photosites and/or on the 2D image pixel(s) between the depth photosites.

Figure 12A:
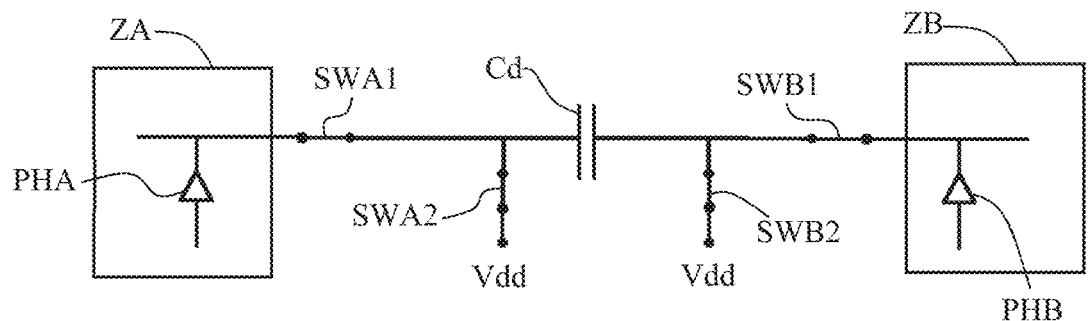
FIG. 12A illustrates a step of an embodiment of a differential readout method.
Figure 12B:
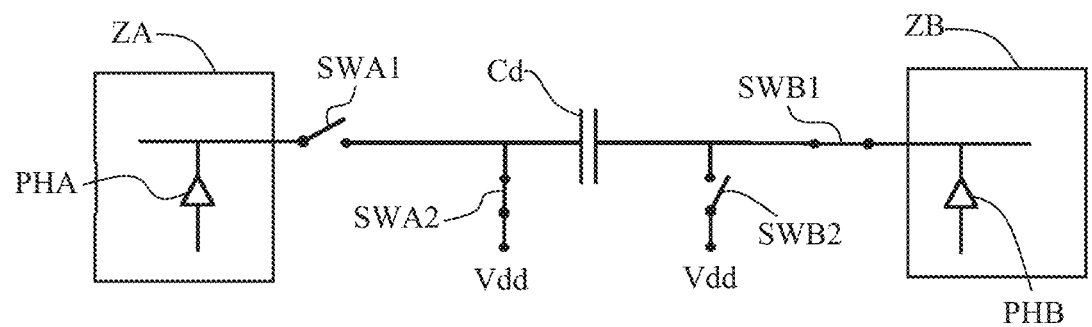
FIG. 12B illustrates another step of the method.

FIGS. 12A to 12B illustrate successive steps of an embodiment of a readout method in the case of an arrangement such as shown in FIGS. 10 and 11. According to the present embodiment, a first plate of capacitor Cd is coupled to the photodiode PHA of a first photosite ZA by a switch SWA1 and is coupled to the source of high reference potential Vdd by a switch SWA2, and the second plate of capacitor Cd is coupled to the photodiode PHB of a second photosite ZB by a switch SWB1 and is coupled to the source of high reference potential Vdd by a switch SWB2. Switches SWA1, SWA2, SWB1, and SWB2 may correspond to MOS transistors.

Figure 12C:
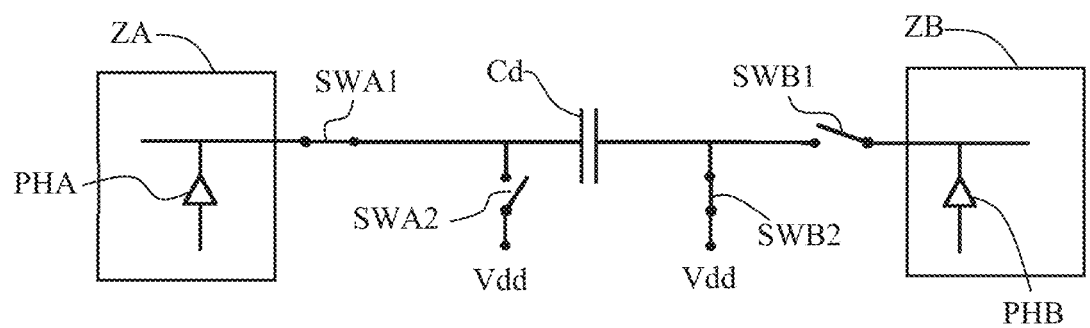
FIG. 12C illustrates another step of the method.
Figure 12D:
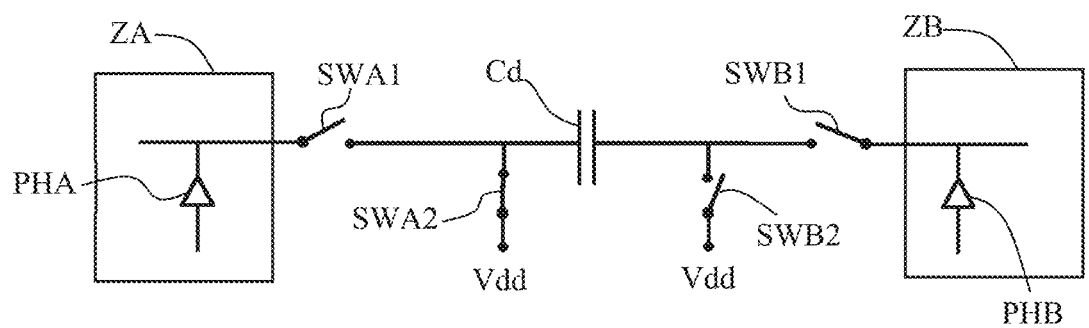
FIG. 12D illustrates another step of the method.

According to an embodiment, a read cycle comprises the following steps:
a) all switches SWA1, SWA2, SWB1, and SWB2 are on. Capacitor Cd is discharged by the connection of its two plates to the same potential Vdd (FIG. 12A);
b) switches SWA2 and SWB1 are on and switches SWA1 and SWB2 are turned off, which causes a charge transfer from the photodiode PHB of the second photosite ZB to the second plate of capacitor Cd (FIG. 12B);
c) switches SWA1 and SWB2 are turned on and switches SWA2 and SWB1 are turned off, which causes a charge transfer from the photodiode PHA of the second photosite ZA to the first plate of capacitor Cd (FIG. 12C); and
d) switches SWA1, SWB1, and SWB2 are off and switch SWA2 is turned on, which enables to read the voltage across capacitor Cd (FIG. 12D).

Steps b) and c) are repeated several thousands of times to store the charges corresponding to the incident signal. At step d), the reading may be performed by double sampling as for a pixel of conventional depth.

According to an embodiment, in the case where the calculation of the phase shift is performed from two successive depth images, a read cycle comprises the implementation of the previously-described method to obtain difference $C_0$-$C_2$ for the first depth image and the implementation of the previously-described method to obtain difference $C_1$-$C_3$ for the second image.

FIG. 13 illustrates a step of an embodiment of a readout method in the case of an arrangement such as shown in FIGS. 8 and 9. In this embodiment, a first plate of capacitor Cd is coupled to the photodiode PH of a photosite Z by switch SWA1 and is coupled to the source of high reference potential Vdd by switch SWA2, and the second plate of capacitor Cd is coupled to the photodiode PH of the same photosite Z by switch SWB1 and is coupled to the source of high reference potential Vdd by switch SWB2. The control of switches SWA1, SWA2, SWB1, and SWB2 may be performed as previously described in relation with FIGS. 12A to 12D.

In the case where the phase shift $\Delta\varphi$ of the light signal is determined according to equation Math_3 by only using three samples $C_0$, $C_1$, and $C_2$, the embodiment of the readout method previously described in relation with FIGS. 12A to 12D of FIG. 13 may be implemented by first photosites to obtain difference $C_0$-$C_1$ and second photosites to obtain difference $C_0$-$C_2$, and third photosites to obtain photosites $C_2$-$C_1$. The acquisition may be performed with a single depth image, the first and second photosites then being different, or with two depth images, where the first and second photosites may then be identical.

FIG. 14 is a circuit diagram illustrating a more detailed embodiment of the electric circuit shown in FIGS. 12A to 12B. As shown in this drawing, photosite ZB has the structure shown in FIG. 3, except that capacitor C is replaced with capacitor Cd. Switch SWB1 corresponds to transistor 44 and switch SWB2 corresponds to transistor 50. Photosite ZA also has the structure shown in FIG. 3, a single quote being added to the references of the circuit of FIG. 3 to differentiate them from those of photosite ZB, except that capacitor C is replaced with capacitor Cd and that transistors 46' and 48' are not present, and are indicated in dotted lines in FIG. 14. Switch SWA1 corresponds to transistor 44' and switch SWA2 corresponds to transistor 50'. The general structure of the two photo sites ZA and ZB coupled by capacitor Cd may thus comprises two transistors less than a structure which would comprise two photosites having the structure shown in FIG. 3.

FIG. 15 is a circuit diagram illustrating a more detailed embodiment of the electric circuit shown in FIG. 13. As shown in this drawing, photosite Z has the structure shown in FIG. 4, except that the two capacitors C are replaced with capacitor Cd. Further, transistors 66 and 68 are not present, and are indicated in dotted lines in FIG. 15. Switch SWB1 corresponds to transistor 44 and switch SWB2 corresponds to transistor 50. Switch SWA1 corresponds to transistor 64 and switch SWA2 corresponds to transistor 70. The structure of the photosite of FIG. 15 may thus comprise two transistors less than the structure shown in FIG. 4.

According to an embodiment, the device 12 of FIG. 1 comprises:
a first sensor formed inside and on top of a first semiconductor substrate, for example, a single crystal silicon substrate, the first sensor comprising a plurality of depth photosites and 2D image pixels; and a second sensor, formed inside and on top of a second semiconductor substrate, for example, a single crystal silicon substrate, the second sensor being placed against a surface of the first sensor and comprising a plurality of depth photosites.

Various embodiments and variants have been described. Those skilled in the art will understand that certain features of these various embodiments and variants may be combined, and other variants will occur to those skilled in the art. Finally, the practical implementation of the described embodiments and variations is within the abilities of those skilled in the art based on the functional indications given hereabove.

The invention claimed is:

1. Device of acquisition of a depth image of a scene, comprising:
 a) depth photosites, and capacitors, each comprising:
  (i) a single photodiode, capable of detecting a reflected light signal corresponding to the reflection on the scene of an incident amplitude-modulated light signal in near infrared, and
  (ii) at least one sense node coupled to the photodiode by a single transistor, and
 b) Capacitors, each capacitor comprising first and second plates, each capacitor being connected between the sense nodes of two photosites or between two sense nodes of a same photosite,
 wherein first depth photosites among the depth photosites are configured:
  to supply the first plate of each first capacitor among the capacitors with at least one first sample of charges photogenerated by detection of the reflected light signal during first time periods each equal to a first portion of the modulation period of the incident light signal, and
  to supply the second plate of each first capacitor with a second sample of charges photogenerated by detection of the reflected light signal during second time periods each equal to a second portion of the modulation period of the incident light signal, said second time periods being offset with respect to the first times periods by a first constant phase shift, and
 wherein second depth photosites among the depth photosites are configured to supply the first plate of each second capacitor among the capacitors with at least one third sample of charges photogenerated by detection of the reflected light signal during third time periods each equal to a third portion of the modulation period of the incident light signal, said third time periods being offset with respect to the first times periods by a second constant phase shift different from the first phase shift.

2. Device according to claim 1, wherein the first and second samples are supplied by the same depth photosite.

3. Device according to claim 1, wherein the first and second samples are supplied by different depth photosites.

4. Device according to claim 1, wherein fourth depth photosites among the depth photosites are configured to supply the second plate of each third capacitor with a fourth sample of charges photogenerated by detection of the reflected light signal during fourth time periods each equal to a fourth portion of the modulation period of the incident light signal, said fourth time periods being offset with respect to the first time periods by a third constant phase shift different from the first and second phase shifts.

5. Device according to claim 4, wherein the third and fourth samples are supplied by the same depth photosite.

6. Device according to claim 5, wherein the first and second samples are supplied by a same photosite during the acquisition of a first depth image and wherein the third and fourth samples are supplied, during the acquisition of a second depth image, by the same depth photosite having supplied the first and second samples.

7. Device according to claim 4, wherein the first and second samples are supplied by a same depth photosite and wherein the third and fourth samples are supplied by a depth photosite different from the depth photosite having supplied the first and second samples.

8. Device according to claim 4, wherein the third and fourth samples are supplied by different depth photosites.

9. Device according to claim 8, wherein the first and second samples are supplied by different depth photosites and wherein the third and fourth samples are supplied by depth photosites different from the depth photosites having supplied the first and second samples.

10. Device according to claim 8, wherein the first and second samples are supplied by different depth photosites during the acquisition of a first depth image and wherein the third and fourth samples are supplied, during the acquisition of a second depth image, by the depth photosites having supplied the first and second samples.

11. Device according to claim 1, comprising 2D image pixels for the acquisition of a 2D image of the scene.

12. System of acquisition of a depth image comprising the acquisition device according to claim 1, a light source configured to emit the amplitude-modulated incident light signal in near infrared, and a processor configured to determine, from the first, second, and third samples, a phase shift between the incident light signal and the reflected light signal.

13. System according to claim 12, wherein the acquisition device comprises fourth depth photosites among the depth photosites are configured to supply the second plate of each third capacitor with a fourth sample of charges photogenerated by detection of the reflected light signal during fourth time periods each equal to a fourth portion of the modulation period of the incident light signal, said fourth time periods being offset with respect to the first time periods by a third constant phase shift different from the first and second phase shifts, and wherein the processor is configured to determine the phase shift between the incident light signal and the reflected light signal from the first, second, third, and fourth samples.

* * * * *